US006154518A

United States Patent [19]

Gupta

[11] Patent Number: 6,154,518

[45] Date of Patent: Nov. 28, 2000

[54] THREE DIMENSIONAL LOCALLY ADAPTIVE WARPING FOR VOLUMETRIC REGISTRATION OF IMAGES

[75] Inventor: Rajiv Gupta, New York, N.Y.

[73] Assignee: General Electric Company, Schenectady, N.Y.

[21] Appl. No.: 09/186,029

[22] Filed: Nov. 4, 1998

Related U.S. Application Data

[63] Continuation-in-part of application No. 08/738,860, Oct. 28, 1996, Pat. No. 5,848,121.

[51] Int. Cl.[7] .................... G01N 23/04

[52] U.S. Cl. .................... 378/62; 378/98.12; 378/4; 382/130

[58] Field of Search .................... 378/4, 15, 20, 378/62, 98.11, 98.12; 382/130; 600/407, 481

[56] References Cited

U.S. PATENT DOCUMENTS

| | | | |
|---|---|---|---|
| 5,048,103 | 9/1991 | Leclerc et al. | 382/294 |
| 5,210,415 | 5/1993 | Ito | 250/584 |
| 5,490,221 | 2/1996 | Ransford et al. | 382/130 |
| 5,568,384 | 10/1996 | Robb et al. | 707/532 |
| 5,647,360 | 7/1997 | Bani-Hashemi et al. | 600/425 |
| 5,690,106 | 11/1997 | Bani-Hashemi et al. | 600/425 |
| 5,839,440 | 11/1998 | Liou et al. | 600/431 |

FOREIGN PATENT DOCUMENTS

| | | |
|---|---|---|
| 0599345A | 9/1994 | European Pat. Off. . |
| 0655712 A2 | 11/1994 | European Pat. Off. . |
| WO94/18639 | 8/1994 | WIPO . |

OTHER PUBLICATIONS

[Gupta et al, 1994] R. Gupta and C. Srinivas. Image Warping for Accurate Digital Subtraction Angiography, Proc. Of AAAI Spring Symposium on Applications for Computer Vision in Medical Image Processing, Stanford University, Mar. 31–23, 1994.

[Hannah 1980] M.J. Hannah, Bootstrap Stereo, Proc. Image Understanding Workshop, College Park, MD, pp. 201–208, Apr. 1980.

[Hannah 1985] M.J. Hannah, SRI's Baseline Stereo System, Technical Report Tech. Note 365, SRI International Artificial Intelligence Center, Oct. 1985. 149–155.

[Quam 1987] L.H. Quam, Heirarchical Warp Stereo, In M.S. Fischler and O.˜Firschein, editors, Reading in Computer Vision, pp. 80–86. Morgan Kaufmann Publishers, Inc., 1987.

[Hannah 1984] M.J. Hannah, Test Results from SRI's Stereo System, SRI International Artificial Intellegence Center, pp. 740–744.

*Primary Examiner*—David V. Bruce
*Attorney, Agent, or Firm*—Marvin Snyder; Douglas E. Stoner

[57] ABSTRACT

Locally-adaptive, sub-voxel registration of two volumetric data sets is performed by generating match points and then, using the match points, generating a locally-adaptive image-to-warp transformation. Generation of the match points is accelerated by generating a volume hierarchy and then identifying a set of 3D points in the first volume for designation as interesting points. Interesting points in the first volume are then matched with their corresponding points in the second volume. After performing match point generation, points on a cubic grid in the first volume are matched to the corresponding match points in the second volume by resampling the match points on the cubic grid in the first volume. After a grid of match points has been identified, the displacement (dx, dy, dz) that should be added to each cubic grid point in the first volume to identify the coordinates of the corresponding point in the second volume is determined. Using the displacements in the match points, a warping transformation function that specifies the displacement for each point (x, y, z) in the first volume is determined. The transformation function maps the matched points in the first volume to corresponding points in the second volume by determining the amount of displacement in the x, y and z directions.

20 Claims, 3 Drawing Sheets

THREE DIMENSIONAL LOCALLY ADAPTIVE WARPING FOR VOLUMETRIC REGISTRATION OF IMAGES

RELATED APPLICATIONS

The present application is a continuation-in-part application of U.S. patent application Ser. No. 08/738,860, filed Oct. 28, 1996 now U.S. Pat. No. 5,848,121 of Dec. 8, 1998.

BACKGROUND OF THE INVENTION

This invention relates generally to imaging and, more particularly, to registering volumetric images.

A volumetric medical imaging system includes a two-dimensional data acquisition system and generates three-dimensional (3D) images. For example, a known volumetric computed tomography (VCT) imaging system includes two-dimensional arrays of detector elements for gathering attenuation measurements in the x, or "in-slice", direction and in the z, or "slice", direction. The attenuation measurements are collected and processed to generate a 3D image.

In some imaging applications, such as volumetric digital subtraction angiography (DSA) for observing vasculature, two volumetric images are generated from data sets obtained from two scans performed at different times. For example, in one known DSA imaging method, X-ray images of anatomy are taken before and after an X-ray opaque contrast agent is injected into the blood vessels. The X-ray image taken before injecting the contrast agent is sometimes referred to as the mask image and the X-ray image taken after injecting the contrast agent is sometimes referred to as the opacified image. Logarithmic subtraction of the mask image from the opacified image should remove all but the image data associated with the opacified blood vessels.

Volumetric data sets acquired at two different times from the same patient, however, rarely match each other on a point by point basis. Patient motion, including involuntary motion of certain organs, a change in camera parameters as a function of time, and hysteresis in the sensor, i.e. non-repeatability from one scan to the next, are common causes of the data set misregistration. Such misregistration causes image artifacts in, for example, DSA images. The misregistration in the two data sets, however, is a complex spatial function and cannot be corrected by simple techniques such as translation, or rigid-body rotation, of one data set with respect to the other set.

Known attempts to reduce such artifacts include utilizing global transforms, or a transform applied to a subvolume, to generate a "warped" image for subtraction. Such known attempts, however, do not provide a single warping transformation which takes into account local displacement at each match point for an entire volumetric image.

BRIEF SUMMARY OF THE INVENTION

Briefly, in accordance with a preferred embodiment of the invention, a locally-adaptive, sub-voxel registration of two volumetric data sets is performed. Generally, the registration is performed by generating match points and then, using the match points, generating a locally-adaptive image-to-warp transformation. Such registration of volumetric images is particularly useful in generating a volumetric DSA image.

More particularly, and with respect to generation of the match points, a volume hierarchy is generated to accelerate the determination of match points. After generating the volume hierarchy, a set of 3D points in the first volume is identified and designated as a set of interesting points. The points are selected based on the criterion that the entropy in the local neighborhood of the point is maximal.

The interesting points in the first volume are then matched with their corresponding points in the second volume. In order to match a point in the first image to its corresponding point in the second image, a small sub-volume of imagery around the point in the first image is correlated with all sub-volumes in the second image. This process proceeds hierarchically from a lowest resolution image to a highest resolution image. Once a reliable transform $\Gamma$ is obtained, all interesting points are resampled to define matches using the transform $\Gamma$.

After performing match point generation, a set of points on a cubic grid in the first volume is matched to the corresponding match points in the second volume by resampling the match points on a cubic grid in the first volume. Once a grid of match points has been identified, the displacement vector (dx, dy, dz) that should be added to each cubic grid point in the first volume to identify the coordinates of the corresponding point in the second volume is determined. Using the displacements in the match points, a warping transformation function that determines the displacement for each point (x, y, z) in the first volume is determined. The transformation function maps the matched points in the first volume to corresponding points in the second volume by determining the amount of displacement in the x, y and z directions. This mapping function is valid not only for the grid points, but also all points between.

Importantly, the three displacements along x, y and z are treated separately, and interpolation preserves the values at the grid points. The location of each voxel in the first volume is transformed by the displacements given by interpolation to identify the location of the corresponding voxel in the second volume. The second volume can be compared with the transformed first volume on a voxel-by-voxel basis. If the two volumes represent pre-contrast and post-contrast volumes, then a digital subtraction angiogram image can be generated by subtracting from the logarithm of each voxel value in the second volume, the logarithm of the corresponding voxel value in the transformed (i.e., warped) volume.

The above described process provides a single warping transformation which takes into account local displacement at each match point for an entire volumetric image. Such warping transformation facilitates reducing image artifacts in volumetric DSA images and in other images generated by comparing two images of the same patient anatomy taken at different times.

DETAILED DESCRIPTION OF THE INVENTION

Figure 1:
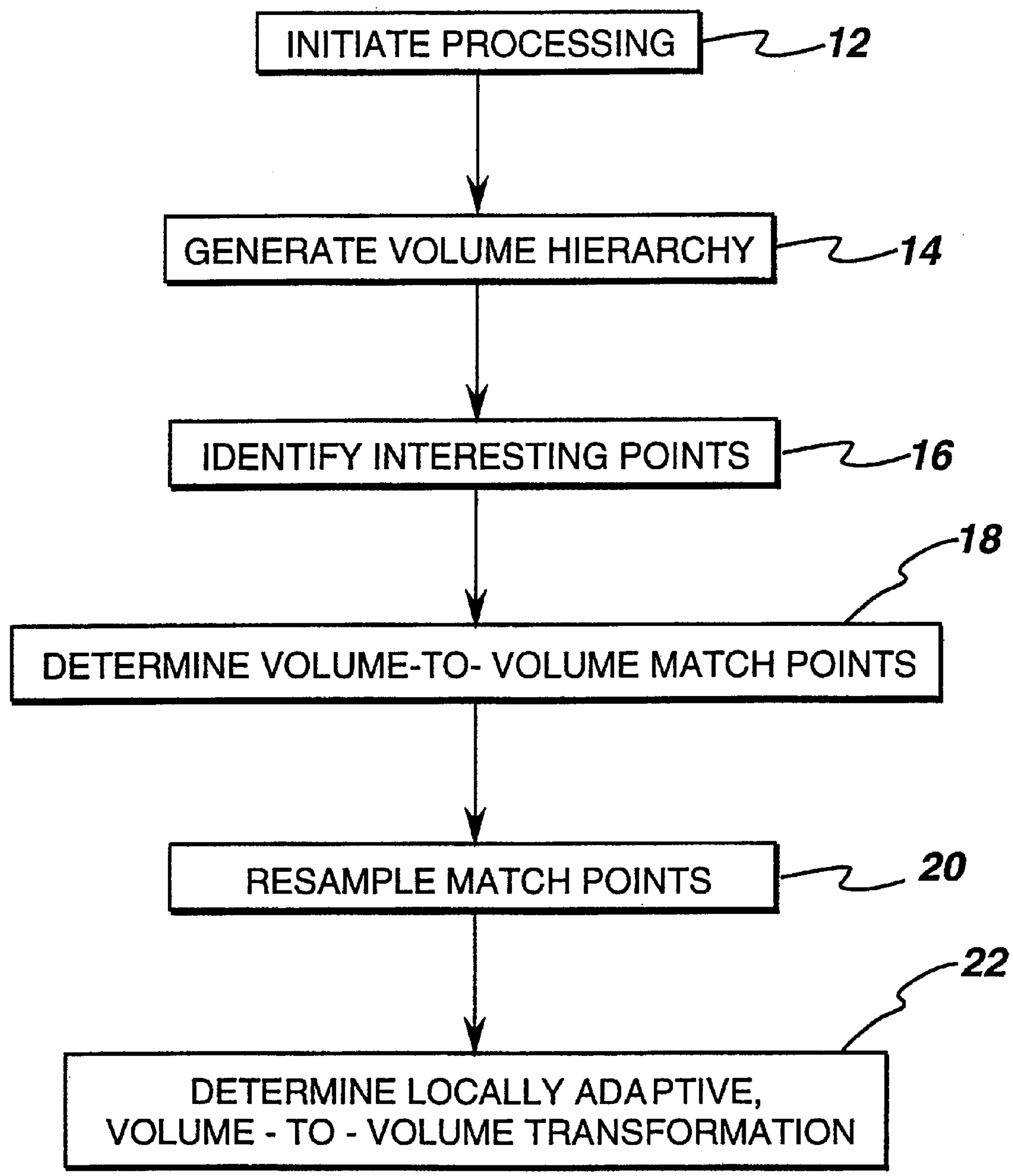
FIG. 1 is a flow chart illustrating processing steps in accordance with a preferred embodiment of the invention.

The flow chart of FIG. 1 illustrates a method or process 10 for registration of two volumes of image data sets, in accordance with a preferred embodiment of the invention. Prior to executing method 10, first and second data sets for a region of interest within a body undergoing examination are obtained. The data can be collected using, for example, a CT scanner, a magnetic resonance (MR) scanner, or other type of scanner. Although the registration method is sometimes described herein in connection with a CT scanner, it should be understood that the method is not limited to practice with such type of scanner.

In addition, and although the method is sometimes described herein in connection with DSA, the invention can be used in applications other than DSA. For example, the data may simply be data collected from the same patient at two different times in order to establish whether any anatomical changes have occurred in the patient since the time at which the first data set was collected.

Also, the method may be implemented in software executed by a computer that may form part of the scanner. For example, known CT scanners typically include a computer coupled to the data acquisition system, and the computer can be operated, in combination with the software program, to execute the process steps described below. Alternatively, the method can be implemented in an application specific integrated circuit (ASIC) including a microcontroller, for example.

As indicated in FIG. 1, after processing has been initiated at step 12, a volume hierarchy is generated at step 14. The volume hierarchy, or pyramid, is constructed to accelerate the determination of match points. More specifically, the two volumes, or volumetric image sets, of collected data (e.g., the mask data set and the opacified data set) may be denoted as V1 and V2, or volume 1 and volume 2. The volumetric image sets are successively reduced in this stereo pair to half the original size, and resolution, by subsampling using Gaussian convolution. That is, each volume set is recursively reduced in resolution by subsampling at half the original resolution. This results in a sequence of volumes, each at half the resolution of the previous volume. The sequence may include 3 to 4 hierarchical levels.

For example, starting with a volume of 1024×1024×1024 voxels, sub-sampling results in the following volumes: 512×512×512, 256×256×256, 128×128×128, and 64×64×64. Rather than sub-sampling via tri-linear interpolation, Gaussian smoothing may also be used for generating the next volume in the series.

Figure 2:
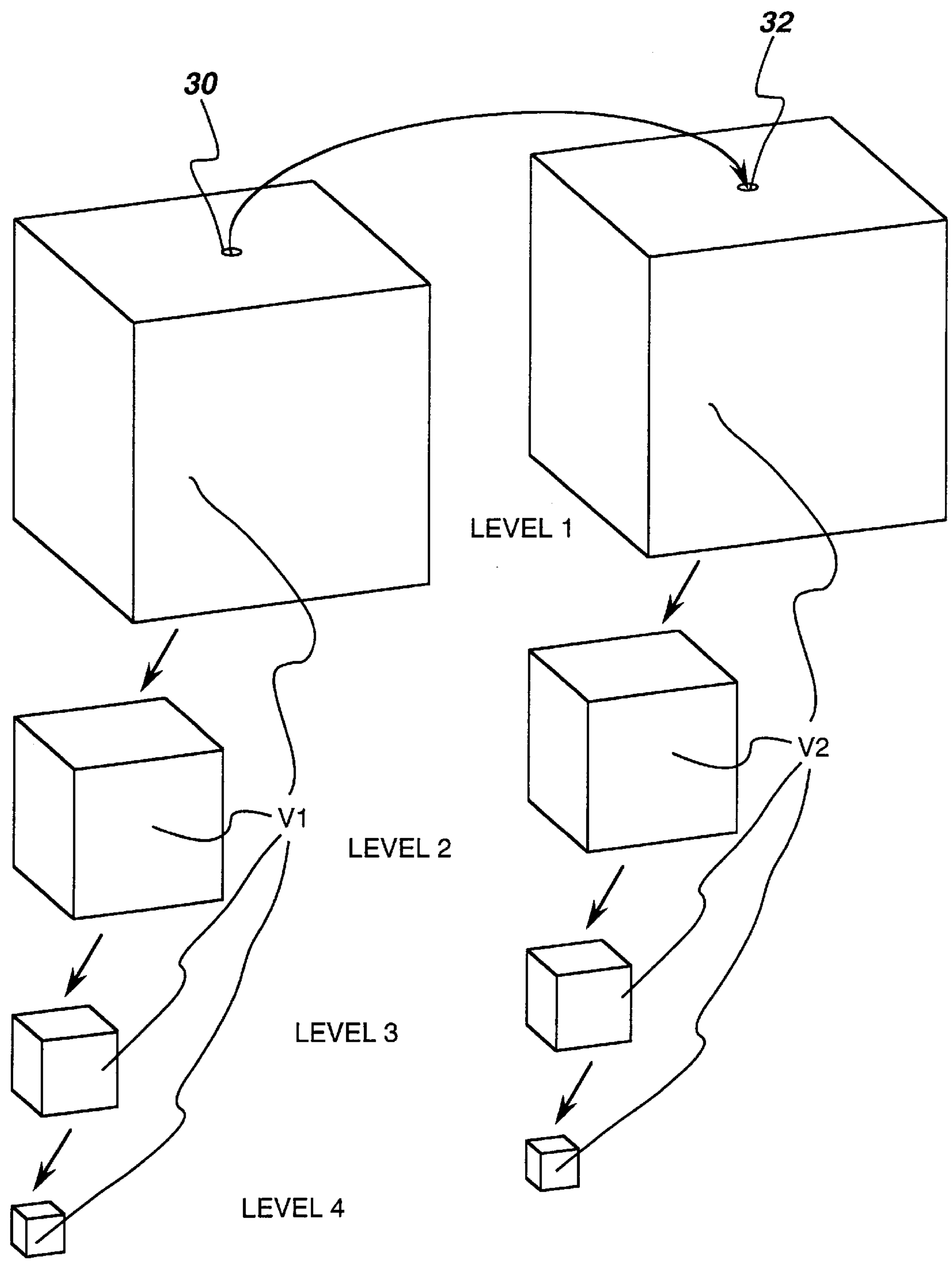
FIG. 2 illustrates an exemplary image hierarchy.

A typical image hierarchy is shown in FIG. 2. In each volumetric image pair shown, at any hierarchical level, the image on the left side of FIG. 2 is the first volume and the image on the right side of FIG. 2 is the second volume. Four hierarchical levels are illustrated in FIG. 2.

After generating the volume hierarchy, as shown in FIG. 2, step 16 of FIG. 1 indicates that a set of 3D points in the first volume is identified and designated as a set of interesting points. The points are selected based on the criterion that entropy in the local neighborhood of each of the points is maximal. Instead of entropy, standard deviation may be used as the selection criterion. The interesting points are identified in the first volume at the highest resolution image set. Points of high local intensity variation are considered “interesting” because they are easy to match.

Interesting points in the first volume are then matched, at step 18 of FIG. 1, with their corresponding points in the second volume. For illustration purposes only, a point 30 in volume 1 at level 1 is mapped to a point 32 in volume 2 at level 1, as shown in FIG. 2. The process results in a dense set of matches between the volumes. More specifically, in order to match a point in the first volumetric image set to its corresponding point in the second volumetric image set, a small sub-volume of imagery around point 30 in the first image is correlated with all sub-volumes in the second volumetric image set. This process proceeds hierarchically from the lowest resolution image (e.g., level 4) to the highest resolution image (i.e., level 1). The center of the sub-volume in the second volumetric image set which gives the maximum correlation is declared to be the corresponding match point.

The image sub-volumes in the first and the second volumetric image sets may be rotated or translated with respect to each other. Any mismatch resulting from such rotation or translation is corrected using a 3D perspective transformation of the first image sub-volume to the neighborhood of its corresponding sub-volume in the second volumetric image set based on user-provided, rough match points. A perspective transform Γ can be determined in accordance with the transform generation described in Gupta-Srinivas, Image Warping for Accurate Digital Subtraction Angiography, Proc. of AAAI, Spring Symposium on Applications of Computer Vision in Medical Image Processing, Stanford University, Mar. 21–23, 1994.

Initially, only the interesting points in the first volume are matched with corresponding points in the second volume. That is, only the points that are easiest to match are matched. Once a reliable transform Γ is obtained, step 20 of FIG. 1 indicates that all interesting points are resampled to define matches using the transform Γ.

In general, any hierarchical matching technique (e.g. the matching technique described in Quam, Hierarchicial Warp Stereo, in M. A. Fischler and O. Firschein, editors, Readings in Computer Vision, Morgan Kaufmann Publishers, Inc., 1987, pages 80–86) can be used. A feature based matching scheme also may alternatively be used, provided that such scheme generates a list of match points. It is also feasible to use an information theoretic measure known as mutual information, as described in Wells et al., Multimodal Volume Registration By Maximization Of Mutual Information, Medical Image Analysis, 1 (1): 35–51, 1996, for determining the fidelity of a match point pair.

Figure 3:
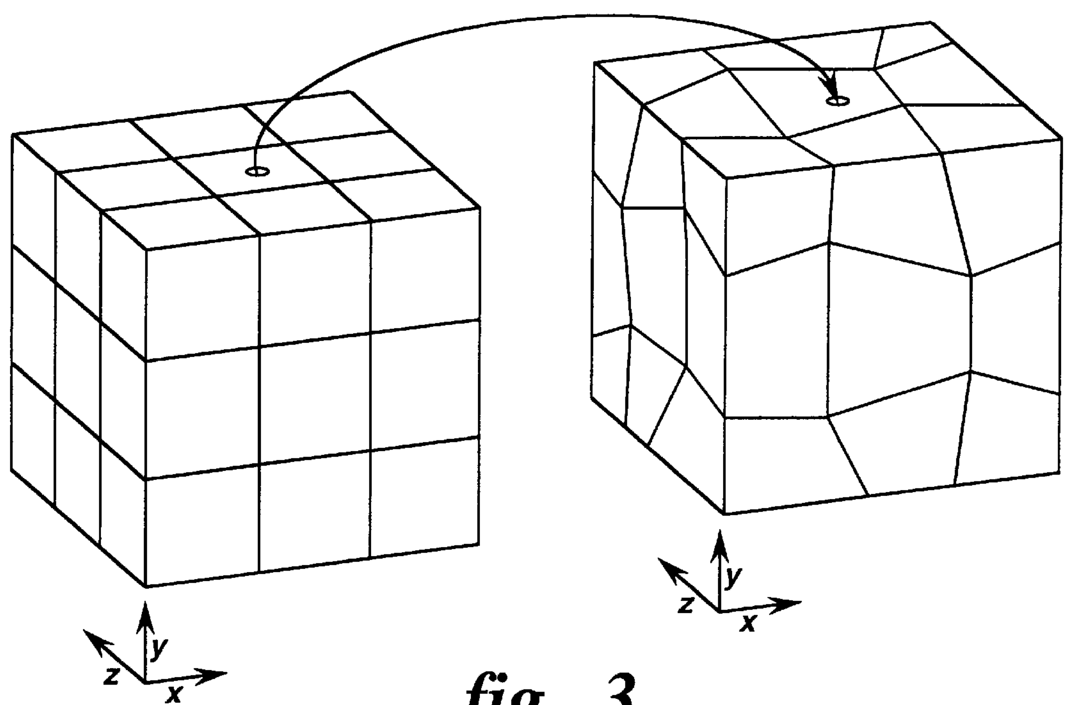
FIG. 3 illustrates matching a cubic grid in the first volume with corresponding points in the second volume.

At step 22 of FIG. 1, after performing match point generation, a locally adaptive, volume-to-volume transformation 22 is identified. More particularly, a set of points on a cubic grid in the first volume is matched to the corresponding match points in the second volume by resampling the match points on the cubic grid in the first volume. Due to patient motion, hysteresis, and other effects, the grid in the second volume is not cubic, as shown in FIG. 3. Once a grid of match points has been identified, the displacement (dx, dy, dz) in the x, y and z directions, respectively, that should be added to each cubic grid point in the first volume to identify the coordinates of the corresponding point in the second volume is determined.

Using the displacements in the match points, a warping transformation function that determines the displacement for each point (expressed by x, y, z coordinates) in the first volume is determined. The transformation function maps the matched points in the first volume to corresponding points in the second volume by determining the amount of displacement in the x, y and z directions.

Considering dx, dy, and dz as separable functions of the first volume coordinates (x, y, z), then:

$$\begin{bmatrix} dx \\ dy \\ dz \end{bmatrix} = \begin{bmatrix} f(x, y, z) \\ g(x, y, z) \\ h(x, y, z) \end{bmatrix}$$

where f, g and h are three unknown functions whose values are known only at the grid points. The values of f, g and h at any arbitrary point in the first volumetric image set are determined by interpolation.

The three displacements along x, y and z axes are treated separately, and interpolation preserves the values at the grid points. Interpolation techniques such as general polynomial transformation, bicubic or thin-plate splines, or other types of global splines can be used for performing the interpolation. Such interpolation techniques are described, for example, in Wolberg, Digital Image Warping, IEEE Computer Society Press, Los Alamitos, Calif., 1990.

The location of each voxel in the first volume is transformed by the displacements given by interpolation to identify the location of the corresponding voxel in the second volume. The second volume can be compared with the transformed first volume on a voxel by voxel basis. If the two volumes represent pre-contrast and post-contrast volumes, then a digital subtraction angiogram image can be generated by subtracting from the logarithm of each voxel value in the second volume, the log of the corresponding voxel value in the transformed (i.e., warped) volume.

When hundreds of match points are determined, a few "bad", i.e. erroneous, matches may be present. To nullify the effect of bad matches, a statistically robust measure of error may be used in the final image-to-image warp. Rather than minimizing the mean square error in mapping match points from the mask image to the opacified image, the median error is minimized.

More specifically, a small sample set of match points is randomly extracted from the full set of match points. Using the sample set, an image-to-image warp is determined as described above. Using this warp, the error in mapping all points from the first volume to the corresponding points in the second volume is determined. The median error is used as the metric for the goodness of a sample.

If it is assumed that more than half the match points are correct, then the probability that the above sample set of match points consists entirely of good match points is greater than 1 out of 32. Also, if more than 50% of the match points are correct or "good", and the volume-to-volume warp is determined using a sample consisting entirely of good points, then the median error is not affected by the error in the outlier points.

Accordingly, sample sets are repeatedly identified and processed to determine the median error. The sample that yields the minimum median error after a selected number of iterations, e.g., one hundred iterations, is then used to determine the final image-to-image warp.

Figure 4:
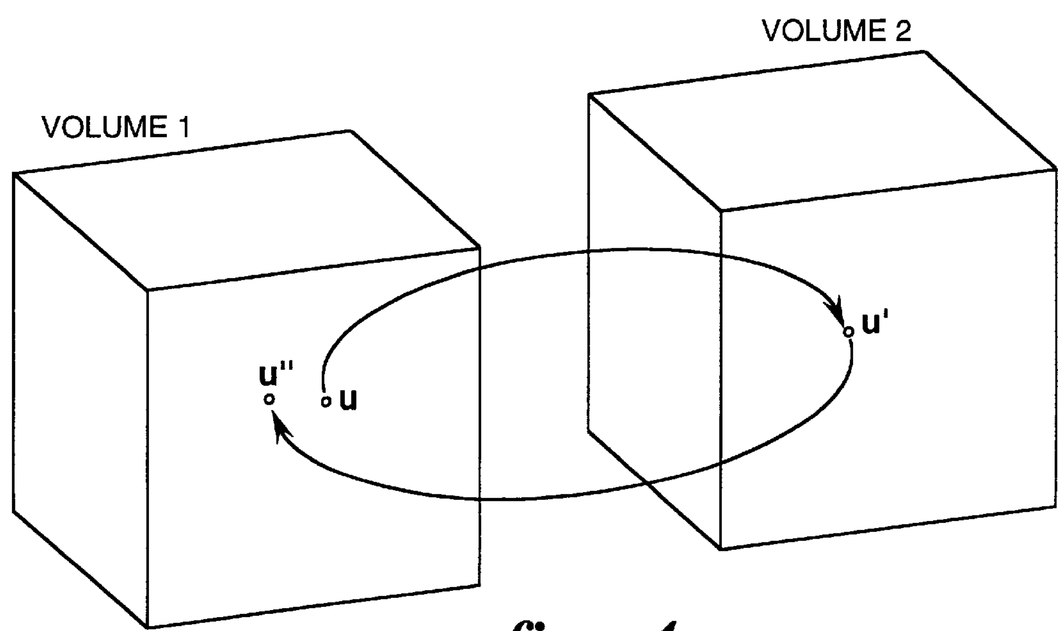
FIG. 4 illustrates the matching process for a point in the first volume with a point in the second volume.

With respect to an exemplary matching process that may be used in performing step 18 (FIG. 1), FIG. 4 illustrates an interesting point u in the first image, and the approximate location of point u in the second image, indicated by point u', is determined using the transformation function Γ. The neighborhood of point u' is then searched for a match. The matching is done at the lowest hierarchical level. Once a match u' is found in the second volume, then processing is reversed, that is, a match point u" in the first volume corresponding to u' in the second volume is identified. Both points u and u" should be the same. If u and u" are close to each other, and the matched points exhibit high correlation, the matched pair is accepted. Often, matching is unsuccessful because, for an interesting point in the first image, the corresponding match point lies outside the second image. Once a pair of matching points u and u' are found in the lowest hierarchical level, the match points are promoted and refined at each successive higher resolution level in the pyramid. This process is repeated with each interesting point to yield a set of match points.

Once a set of match points has been computed, the image-to-image transform Γ' for registering the image subvolumes between the first and the second images is recomputed. In the first iteration, the transform was determined using user-provided match points. The transform Γ' is based on computer-derived match points and is much more accurate. The matching process is then repeated using this new transform. The determination of the transform Γ is fast and only requires solution to the linear system of equations. It is possible to refine Γ at any intermediate point during the hierarchical matching process as more match points become available.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method for generating points in a first volumetric image that register to points in a second volumetric image, comprising the steps of:

generating match points between a set of the first volumetric image data and a set of the second volumetric image data; and generating a locally-adaptive volume-to-volume image transform using the generated match points.

2. A method in accordance with claim 1 wherein the step of generating match points comprises the steps of generating a volume hierarchy, and identifying interesting points in the first volumetric image.

3. A method in accordance with claim 2 wherein the step of generating a volume hierarchy comprises the step of generating multiple image data sets having successively reduced resolution for the first and second volumetric image data sets.

4. A method in accordance with claim 3 wherein an image data hierarchy is generated by successively reducing both volumetric images in a stereo pair to approximately about half their original size with subsampling using Gaussian convolution.

5. A method in accordance with claim 2 wherein the step of identifying interesting points in the first volumetric image is performed by basing identification of said interesting points on high local intensity variation.

6. A method in accordance with claim 1 wherein the step of generating match points comprises:

generating a volume hierarchy;

selecting image data of lowest resolution; and for the selected image data:

(a) identifying a set of interesting points in the set of the first volumetric image data;

(b) matching the interesting points in the set of the first volumetric image data with corresponding points in the set of the second volumetric image data;

(c) determining a perspective transform for registering image subvolumes between the sets of first and second volumetric image data; and (d) selecting a set of next highest resolution volumetric image data and repeating steps (a)–(c) if a set of volumetric image data of highest resolution has not been selected; and (e) ending the match point generation when the set of volumetric image data of highest resolution has been selected.

7. A method in accordance with claim 1 wherein the step of generating a locally-adaptive volume-to-volume image transform using the generated match points comprises the steps of:

matching a set of points on a cubic grid in the first volume with corresponding match points in the second volume; and determining a displacement (dx, dy, dz) to be added to each cubic grid point in the first volume to identify coordinates of the corresponding match point in the second volume.

8. A method in accordance with claim 7 wherein displacement terms dx, dy and dz are related by:

$$\begin{bmatrix} dx \\ dy \\ dz \end{bmatrix} = \begin{bmatrix} f(x, y, z) \\ g(x, y, z) \\ h(x, y, z) \end{bmatrix}$$

where f, g, and h are unknown functions whose values are known only at grid points.

9. A method in accordance with claim 8 further comprising the step of determining values of f, g, and h at an arbitrary point in the first image by interpolation.

10. A method in accordance with claim 9 wherein each pixel in the first volumetric image is transformed by the displacement given by interpolation to find the corresponding pixel in the second image.

11. A method in accordance with claim 1 further comprising the step of subtracting the logarithm of a warp image data value from the logarithm of a corresponding second volumetric image data value.

12. Apparatus for generating registering points in a first volumetric image to points in a second volumetric image, said apparatus comprising a processor programmed to generate match points between a set of the first volumetric image data and a set of the second volumetric image data, and to generate a locally-adaptive volume-to-volume image transform using the generated match points.

13. Apparatus in accordance with claim 12 wherein, to generate said match points, said processor is programmed to generate a volume hierarchy and to identify interesting points in the first volumetric image.

14. Apparatus in accordance with claim 12 wherein, to generate said match points, said processor is programmed to:

generate a volume hierarchy;

select the image data of lowest resolution; and for the selected image data, to:

(a) identify a set of interesting points in the set of the first volumetric image data;

(b) match the interesting points in the set of the first volumetric image data with corresponding points in the set of the second volumetric image data;

(c) determine a perspective transform for registering image subvolumes between the sets of first and second volumetric image data; and (d) select a set of next highest resolution volumetric image data and repeat steps (a)–(c) if a set of volumetric image data of highest resolution has not been selected; and (e) end the match point generation when the set of volumetric image data of highest resolution has been selected.

15. Apparatus in accordance with claim 12 wherein, to generate a locally-adaptive volume-to-volume image transform using the generated match points, said processor is programmed to match a set of points on a cubic grid in the first volume with corresponding match points in the second volume, and to determine a displacement (dx, dy, dz) to be added to each cubic grid point in the first volume to identify coordinates of the corresponding match point in the second volume.

16. Apparatus in accordance with claim 15 wherein displacement terms dx, dy and dz are related by:

$$\begin{bmatrix} dx \\ dy \\ dz \end{bmatrix} = \begin{bmatrix} f(x, y, z) \\ g(x, y, z) \\ h(x, y, z) \end{bmatrix}$$

where f, g, and h are unknown functions whose values are known only at grid points.

17. Apparatus in accordance with claim 12 wherein said processor is further programmed to subtract the logarithm of a warp image data value from the logarithm of a corresponding second volumetric image data value.

18. Apparatus for generating registering points in a volumetric mask image data set to points in a volumetric opacified image data set, said apparatus comprising a processor programmed to: generate match points between the volumetric mask image data set and the opacified image data set; generate a locally-adaptive volume-to-volume image transform using the generated match points to generate a volumetric warp image; and subtract the logarithm of a warp image data value from the logarithm of a corresponding opacified image data value.

19. Apparatus in accordance with claim 18 wherein, to generate said match points, said processor is programmed to:

generate a volume hierarchy;

select the image data of lowest resolution; and for the selected image data, to:

(a) identify a set of interesting points in the mask image data;

(b) match the interesting points in the mask image data with corresponding points in the opacified image data;

(c) determine a perspective transform for registering image subvolumes between the mask and opacified image data; and (d) select next highest resolution image data and repeat steps (a)–(c) if the highest resolution image data have not been selected; and (e) end the match point generation when the highest resolution image data have been selected.

20. Apparatus in accordance with claim 18 wherein to generate a locally-adaptive volume-to-volume image transform using the generated match points, said processor is programmed to match a set of points on a cubic grid in the mask image data with corresponding match points in the opacified image data, and to determine a displacement (dx, dy, dz) to be added to each cubic grid point in the mask image data to identify coordinates of the corresponding point in the opacified image data.

* * * * *